(12) United States Patent
Lee et al.

(10) Patent No.: US 12,304,356 B2
(45) Date of Patent: May 20, 2025

(54) APPARATUS, METHOD AND COMPUTER READABLE STORAGE MEDIUM FOR CONTROLLING BRAKING OF VEHICLE

(71) Applicants: HYUNDAI MOTOR COMPANY, Seoul (KR); Kia Corporation, Seoul (KR)

(72) Inventors: Yong Hwa Lee, Gwacheon-si (KR); Kyung Ho Yoon, Suwon-si (KR); Ho Wook Lee, Seoul (KR); Gwi Chul Kim, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 336 days.

(21) Appl. No.: 17/739,492

(22) Filed: May 9, 2022

(65) Prior Publication Data

US 2023/0150372 A1    May 18, 2023

(30) Foreign Application Priority Data

Nov. 15, 2021   (KR) .......................... 10-2021-0156754

(51) Int. Cl.
  *B60L 7/26*    (2006.01)
  *B60T 8/1755*  (2006.01)
  *B60T 8/1761*  (2006.01)

(52) U.S. Cl.
  CPC .............. *B60L 7/26* (2013.01); *B60T 8/1755* (2013.01); *B60T 8/17616* (2013.01);
  (Continued)

(58) Field of Classification Search
  CPC ...... B60L 7/26; B60T 8/1755; B60T 8/17616; B60T 2270/10; B60T 2270/304; B60T 2270/604
  See application file for complete search history.

(56) References Cited

U.S. PATENT DOCUMENTS 5,476,310 A * 12/1995 Ohtsu ..................... B60L 7/003
                                                              303/3
7,922,265 B1    4/2011 Cottrell, V
(Continued)

FOREIGN PATENT DOCUMENTS

JP         2007022527 A  *  2/2007
JP         2007151397 A  *  6/2007
(Continued)

*Primary Examiner* — Justin S Lee
(74) *Attorney, Agent, or Firm* — Morgan, Lewis & Bockius LLP

(57) ABSTRACT

A an apparatus of controlling a braking of a vehicle traveling in track mode includes a driving information detector configured to detect a braking request from a driver while the vehicle is driving; and a vehicle controller configured to, when the braking request is detected, control the braking of the vehicle according to a total required torque in response to the detected braking request, wherein the total required torque is a sum of a regenerative braking torque by a motor of the vehicle and a friction braking torque by a brake of the vehicle, wherein the vehicle controller is configured to decrease braking force by friction braking by relatively decreasing friction braking torque by increasing the regenerative braking torque of the total required torque, and wherein the regenerative braking torque is greater than a regenerative braking torque in non-track mode.

15 Claims, 5 Drawing Sheets

(52) U.S. Cl.
CPC ..... *B60T 2270/10* (2013.01); *B60T 2270/304* (2013.01); *B60T 2270/604* (2013.01)

(56) References Cited

U.S. PATENT DOCUMENTS

| | | | |
|---|---|---|---|
| 2007/0228821 A1* | 10/2007 | Maki | B60W 10/184 |
| | | | 303/151 |
| 2012/0038208 A1* | 2/2012 | Matsushita | B60W 10/184 |
| | | | 303/3 |
| 2013/0162009 A1 | 6/2013 | Mitts et al. | |
| 2016/0129791 A1 | 5/2016 | Huh et al. | |
| 2016/0159225 A1* | 6/2016 | Nakatsu | B60L 15/2009 |
| | | | 701/70 |
| 2016/0167527 A1* | 6/2016 | Jeon | B60L 7/26 |
| | | | 701/70 |
| 2016/0264111 A1* | 9/2016 | Doi | B60T 8/267 |
| 2018/0281760 A1* | 10/2018 | Watanabe | B60K 17/348 |
| 2022/0080837 A1* | 3/2022 | Pettersson | B60T 8/17551 |

FOREIGN PATENT DOCUMENTS

| | | | | |
|---|---|---|---|---|
| JP | 2007178000 A | * | 7/2007 | ............ B60K 6/365 |
| JP | 2020-111245 A | | 7/2020 | |
| KR | 10-1664580 B1 | | 10/2016 | |
| KR | 10-1780066 B1 | | 10/2017 | |
| KR | 10-2020-0110930 A | | 9/2020 | |

* cited by examiner

APPARATUS, METHOD AND COMPUTER READABLE STORAGE MEDIUM FOR CONTROLLING BRAKING OF VEHICLE

CROSS-REFERENCE TO RELATED APPLICATION(S)

The present application claims priority to Korean Patent Application No. 10-2021-0156754 filed on Nov. 15, 2021 the entire contents of which is incorporated herein for all purposes by this reference.

BACKGROUND OF THE PRESENT DISCLOSURE

Field of the Present Disclosure

The present disclosure relates to an apparatus, a method and a computer readable storage medium for controlling braking of vehicle.

Description of Related Art

When driving in track mode, rapid acceleration and rapid deceleration may be repeated for a fast lap time, and a sufficiently large brake amount may be necessary to convert a large amount of kinetic energy into thermal energy due to braking according to rapid acceleration and rapid deceleration.

However, when heat capacity is insufficient, as a brake size is insufficient, fade and vapor lock phenomena may occur, such that, when a driver steps on a brake pedal, braking force desired by the driver may not be generated. Thus, when driving in track mode, brake heat capacity matching power performance may be necessary.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus, a method, and a computer readable storage medium for controlling braking of vehicle, which may prevent fade and vapor lock caused by excessive friction braking (that is, hydraulic braking), and may address the issue of insufficient heat capacity of a brake without increasing a size of the brake.

An aspect of the present disclosure is to provide an apparatus, a method, and a computer readable storage medium for controlling braking of vehicle, which may maintain stability of a vehicle even when driving in track mode in which rapid acceleration and rapid deceleration are repeated and may improve fuel efficiency in preparation for driving in non-track mode.

According to an aspect of the present disclosure, an apparatus of controlling a braking of a vehicle traveling in track mode includes a driving information detector configured to detect a braking request from a driver while the vehicle is driving; and a vehicle controller configured to, when the braking request is detected, control the braking of the vehicle according to a total required torque in response to the detected braking request, wherein the total required torque is a sum of a regenerative braking torque by a motor of the vehicle and a friction braking torque by a brake of the vehicle, wherein the vehicle controller is configured to decrease braking force by friction braking by relatively decreasing friction braking torque by increasing the regenerative braking torque of the total required torque, and wherein the regenerative braking torque is greater than regenerative braking torque in non-track mode.

According to an aspect of the present disclosure, a method for controlling a braking of a vehicle traveling in track mode includes a first operation of detecting a braking request from a driver while the vehicle is driving by a driving information detector; and a second operation of, when the braking request from a driver is detected, controlling braking of the vehicle according to a total required torque in response to the detected braking request by a vehicle controller, wherein the total required torque is a sum of a regenerative braking torque by a motor of the vehicle and a friction braking torque by a brake of the vehicle, wherein the second operation includes reducing braking force by friction braking by relatively decreasing friction braking torque by increasing the regenerative braking torque of the total required torque, and wherein the regenerative braking torque is greater than a regenerative braking torque in non-track mode.

According to an aspect of the present disclosure, a computer readable storage medium to which a program for executing the method in a computer is written is provided.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
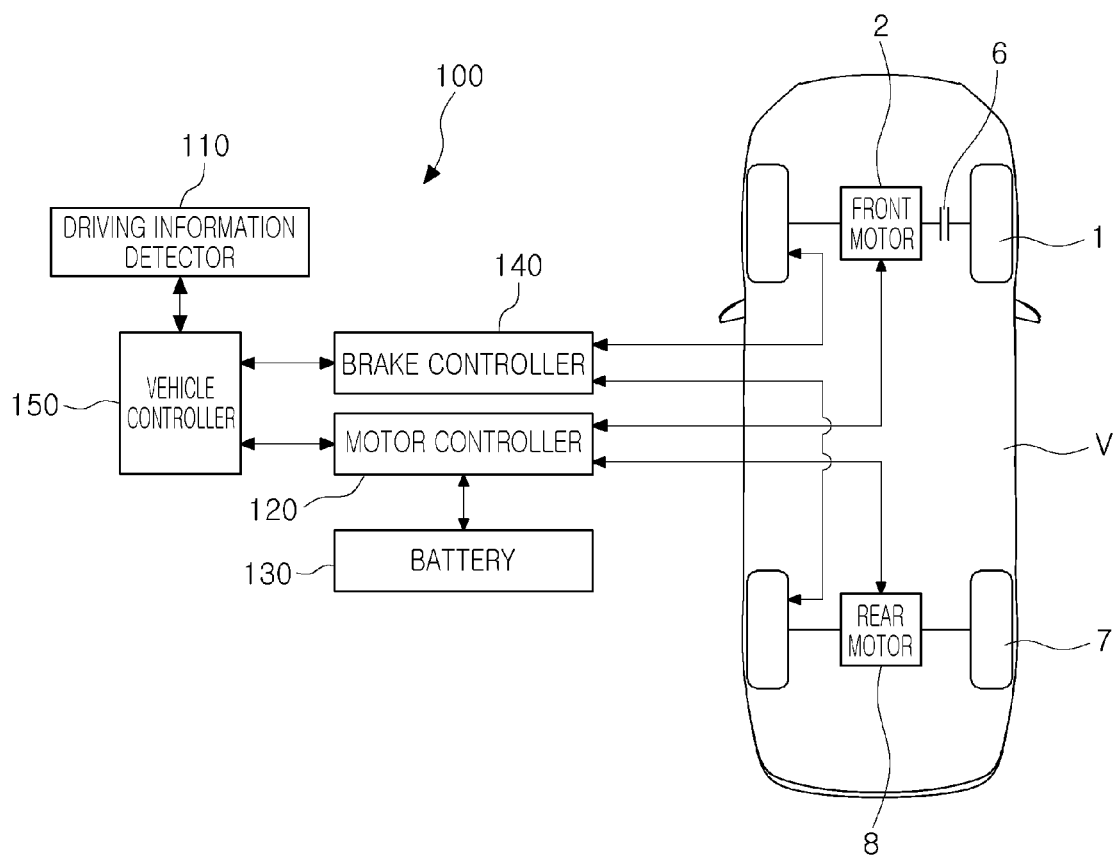
FIG. 1 is a diagram illustrating a configuration including an apparatus of controlling braking of vehicle For instance embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the description below, various embodiments of the present disclosure will be referred to as follows with reference to the appended drawings.

Also, redundant descriptions and detailed descriptions of known functions and elements which may unnecessarily obscure the gist of the present disclosure will be omitted. In the accompanying drawings, some elements may be exaggerated, omitted or briefly illustrated, and the sizes of the elements do not necessarily reflect the actual sizes of these elements.

FIG. 1 is a diagram illustrating a configuration including an apparatus 100 for controlling braking of vehicle according to an exemplary embodiment.

In the exemplary embodiment of the present invention, a vehicle V may be an electric four-wheel drive 4WD vehicle including a front wheel motor 2 and a rear wheel motor 8 on a front wheel 1 and a rear wheel 7, respectively. The present four-wheel drive electric vehicle V may perform two-wheel drive in which the vehicle travels using only one of the front wheels 1 and the rear wheel 7 and four-wheel drive in which the vehicle travels using all axles of the front wheels 1 and rear wheels 7, and two-wheel drive and four-wheel drive may be switched through a disconnector 6. The exemplary embodiment of the present invention may be applied to a 4WD vehicle in which the disconnector 6 is always fastened.

Also, in the exemplary embodiment of the present invention, the apparatus 100 for controlling braking of vehicle may be applied to a vehicle traveling in track mode. Here, track mode refers to a driving mode in which rapid acceleration and rapid deceleration are repeated for driving on a dedicated race track and for a quick lap time. Non-track mode (also referred to as a "normal mode") may be a mode other than track mode, and may refer to, for example, economical mode, normal mode, and sports mode.

The apparatus 100 for controlling braking of vehicle may include a driving information detector 110, a motor controller 120, a battery 130, a brake controller 140, and a vehicle controller 150.

The driving information detector 110 may detect a driving state of the vehicle V and a braking request from a driver, and may transmit the request to the vehicle controller 150.

To the present end, the driving information detector 10 may include a detector for detecting the amount of wheel slip, a detector for detecting a speed of pressing a brake pedal, a detector for detecting a steering angle, a detector for detecting wheel acceleration, a detector for detecting a yaw rate, a detector for detecting a speed of a motor, a detector for detecting a speed of the vehicle, a detector for detecting a positional value of a brake pedal, and the like.

The motor controller 120 may control the driving and torque of motors 2 and 8 according to control of the vehicle controller 150, and may store electricity generated by the motors 2 and 8 during regenerative braking in a battery 130. To the present end, the motor controller 120 may include one or a plurality of microprocessors, and the one or more microprocessors may operate by a program configured for executing a method for controlling the driving and torque of the motors 2 and 8.

The battery 130 may include a plurality of unit cells, and may supply a driving voltage to the motors 2 and 8, and may be charged with a voltage generated by the motors 2 and 8 during regenerative braking.

The brake controller 140 may control hydraulic braking (also referred to as "friction braking") supplied to brake cylinders of the respective driving wheels 1 and 7 under control of the vehicle controller 150. To the present end, one or more microprocessors may be provided in the brake controller 140, and the one or more microprocessors may operate by a program configured for executing a method for controlling hydraulic braking.

When the braking request from a driver is detected, the vehicle controller 150 may obtain a total required torque in response to the detected braking request, and the braking of the vehicle V may be controlled through the motor controller 120 and brake controller 140 according to the obtained total required torque. Here, the braking request from a driver may be detected according to the positional value of the brake pedal, and the total required torque may be represented by a sum of regenerative braking torque by the motors 2 and 8 and friction braking torque by the brake.

According to an exemplary embodiment of the present invention, the vehicle controller 150 may reduce the braking force by friction braking by relatively decreasing friction braking torque by increasing the regenerative braking torque of the above-described total required torque.

As described above, in driving mode such as track mode, a sufficiently large brake size may be required to convert high kinetic energy into thermal energy due to braking according to rapid acceleration and rapid deceleration. However, when the heat capacity is insufficient due to insufficient brake size, fade and vapor lock phenomena may occur so that the amount of braking force desired by a driver may not be generated even when the brake is applied.

Accordingly, according to an exemplary embodiment of the present invention, by increasing the amount of braking by the regenerative braking torque of the total required torque, the amount of braking by friction braking torque may decrease so that fade and vapor lock caused by excessive friction braking (that is, hydraulic braking) may be prevented, and also, the issue of insufficient heat capacity of the brake may be addressed without increasing brake size.

The vehicle controller 150 may determine the regenerative braking torque by configuring an allowable maximum torque of the motors 2 and 8 to be an upper limit value. That is, the regenerative braking torque may be greater than regenerative braking torque in the non-track mode by configuring an allowable maximum torque of the motors to be an upper limit value.

Also, according to an exemplary embodiment of the present invention, when the braking request from a driver is detected, the vehicle controller 150 may control the braking of the vehicle V by equally distributing distribution ratios of the regenerative braking torque of the front wheel motor 2 and the regenerative braking torque of the rear wheel motor 8.

Furthermore, according to an exemplary embodiment of the present invention, when a vehicle speed is greater than a predetermined vehicle speed Tv or a steering angle is greater than a predetermined steering angle Ta, the vehicle controller 150 may control the braking of the vehicle V by configuring distribution ratios of the regenerative braking torque of the front wheel motor 2 and the regenerative braking torque of the rear wheel motor 8 to be different from each other. Here, the predetermined vehicle speed Tv or the predetermined steering angle Ta may be appropriately determined if desired, and an exemplary embodiment thereof is not limited thereto.

Also, according to an exemplary embodiment of the present invention, the amount of wheel slip of the vehicle V is greater than a first wheel slip value Ts1 and is smaller than the second wheel slip value Ts2, the vehicle controller 150 may maintain distribution ratios of the regenerative braking torque of the front wheel motor 2 and the regenerative braking torque of the rear wheel motor 8, and may perform electric brake-force distribution (EBD) control with respect to a front wheel and a rear wheel of the vehicle. The EBD control described above may be a technique for electronically controlled braking force distribution, and may be a technique for automatically distributing appropriate braking force to the front wheel 1 and the rear wheel 7 according to a load of the vehicle V. Also, the first wheel slip value Ts1 or the second wheel slip value Ts2 may be appropriately determined if desired, and an exemplary embodiment thereof is not limited thereto.

Also, according to an exemplary embodiment of the present invention, when the amount of wheel slip of the vehicle V is equal to or greater than the second wheel slip value Ts2, the vehicle controller 150 may perform anti-lock brake system (ABS) control. The above-described ABS control may be a technique for preventing a braking lock or locking phenomenon of the brake and ensuring safety of an occupant.

Also, according to an exemplary embodiment of the present invention, when the braking request from a driver is detected, the vehicle controller 150 may stop the regenerative stability control RSC.

The above-described regenerative stability control may be a technique for improving wheel slip on low-friction roads such as snowy or icy roads. That is, generally, when a driver presses a brake pedal while regenerative braking is performed, the regenerative braking may be stopped by the regenerative stability control. For example, when the driver presses the brake pedal with a braking force of 0.4 g while regenerative braking is performed, regenerative braking may stop, and the braking force of 0.4 g may be converted to hydraulic braking, reducing fuel efficiency.

Therefore, according to an exemplary embodiment of the present invention, by preventing the intervention of the regenerative stability control (RSC) during regenerative braking, fuel efficiency may improve as compared to the driving in the non-track mode.

When the braking request from a driver is not detected, the vehicle controller 150 may perform regenerative stability control. The vehicle controller 150 may control the braking of the vehicle by distributing coasting torque for the front wheel 1 and the rear wheel 7, and when the amount of wheel slip of the vehicle V is greater than a third wheel slip value Ts3, the vehicle controller 150 may perform regenerative stability control (RSC).

According to an exemplary embodiment of the present invention, when one of the amount of wheel slip, a speed of pressing a brake pedal, a steering angle, wheel acceleration, and a yaw rate is less than a predetermined value of each element, the vehicle controller 150 may control the braking of the vehicle in the manner described above. Here, the predetermined value of each element may be appropriately determined if desired, and an exemplary embodiment thereof is not limited thereto.

FIGS. 2A-2D are diagrams illustrating a comparison between regenerative braking torque by a motor and friction braking torque by a brake in braking in normal mode and in track mode, which may be an example in which braking is performed by braking force of 0.8 g at an initial braking speed of 100 kph.

Figure 2A:
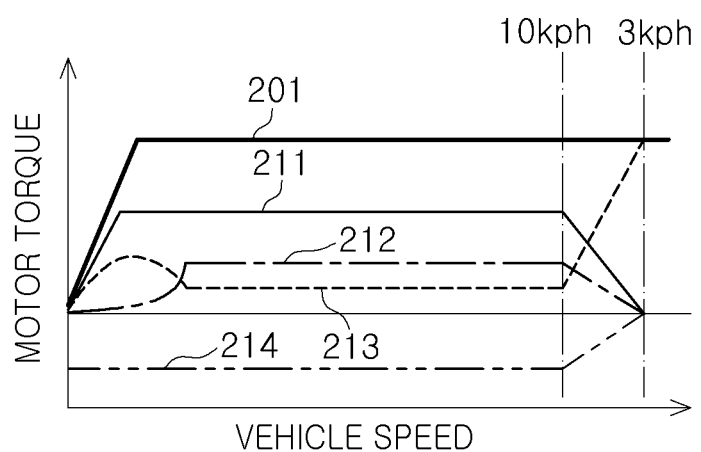
FIG. 2A, FIG. 2B, FIG. 2C and FIG. 2D are diagrams illustrating a comparison between regenerative braking torque by a motor and friction braking torque by a brake in braking in normal mode and in track mode.
Figure 2B:
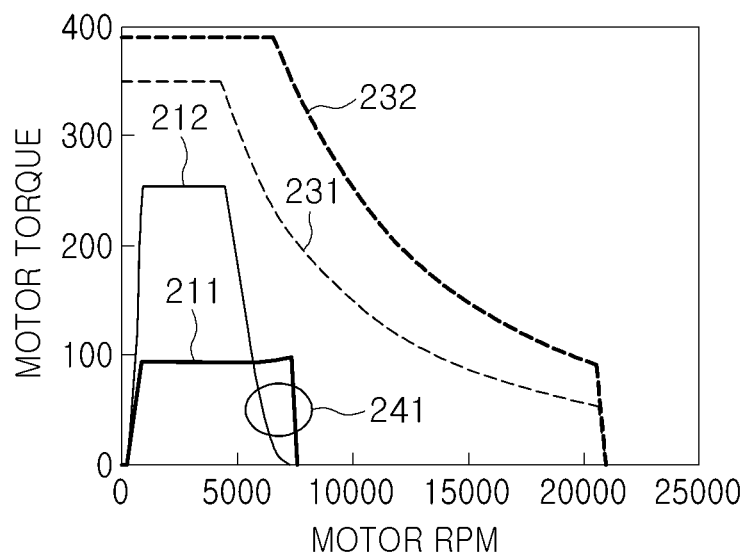
Figure 2C:
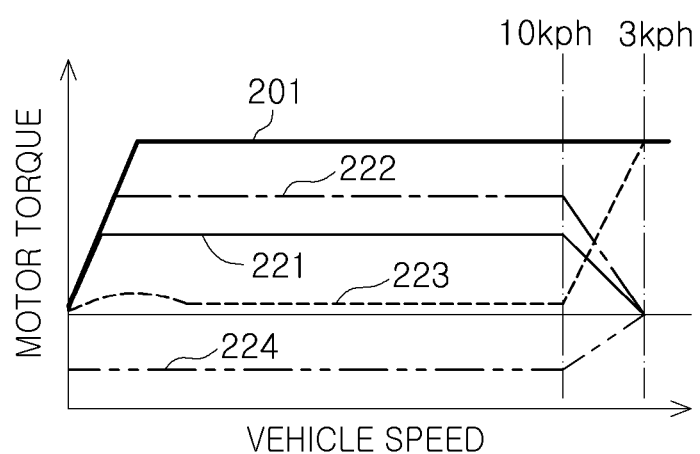
Figure 2D:
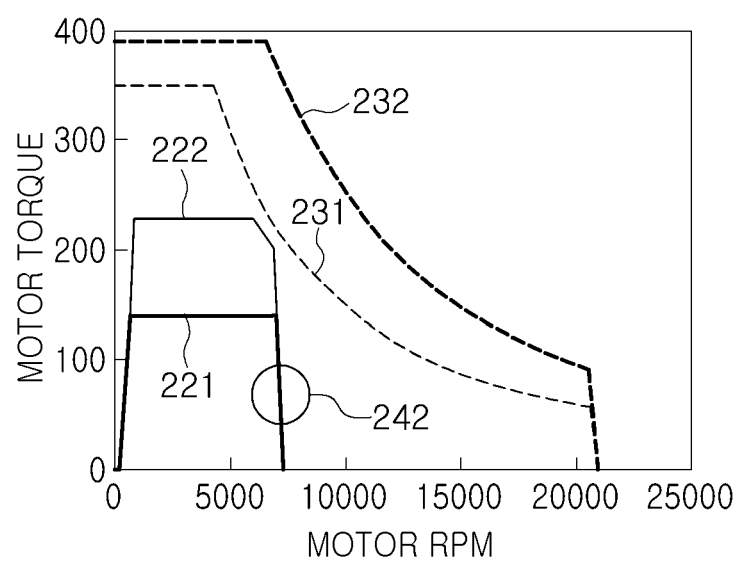

FIG. 2A illustrates the regenerative braking torque of the motor as compared to a vehicle speed during braking in the normal mode, FIG. 2B illustrates the regenerative braking torque as compared to the speed of the motor during braking in the normal mode, FIG. 2C illustrates the regenerative braking torque of the motor as compared to a vehicle speed when braking in track mode, and FIG. 2D illustrates regenerative braking torque as compared to the speed of the motor during braking in track mode.

In FIG. 2, reference numeral 201 denotes total required torque, reference numerals 211 and 221 denote regenerative braking torque of the rear wheel motor 8, reference numerals 212 and 222 denote regenerative braking torque of the front wheel motor 2, reference numerals 213 and 223 denotes friction braking torque, reference numerals 214 and 224 denote coasting torque, reference numeral 231 denotes maximum regenerative braking torque of the front wheel motor 2, and reference numeral 232 denotes maximum regenerative braking torque of the rear wheel motor 8.

In the exemplary embodiment of the present invention, the normal mode may also be referred to as non-track mode, and the normal mode will be described below.

When the braking request from a driver is detected, the braking of the vehicle may be controlled according to the total required torque in response to the detected braking request, where the total required torque may be a sum of the regenerative braking torque by the motor and friction braking torque by the brake. Here, the regenerative braking torque may include the regenerative braking torque of the front wheel motor 2 and the regenerative braking torque of the rear wheel motor 8, which may be a mode in which the regenerative braking torque configured for the rear wheel motor 8 may be reached by controlling the rear wheel motor 8, and the remaining regenerative braking torque obtained by subtracting the regenerative braking torque of the rear wheel motor 8 from the regenerative braking torque may be reached by controlling the front wheel motor 2.

Therefore, in accordance with the speed of the motor during braking, rising points (see 241 in FIG. 2C) of the regenerative braking torque 211 of the rear wheel motor 8 and the regenerative braking torque 212 of the front wheel motor 2 may be different (see 231).

Differently from the normal mode described above, in track mode according to an exemplary embodiment of the present invention, when the braking of the vehicle V is controlled, the braking may be controlled according to distribution ratios of the regenerative braking torque of the front wheel motor 2 and the regenerative braking torque of the rear wheel motor 8, and accordingly, the regenerative braking torque of the front wheel motor 2 and the regenerative braking torque of the rear wheel motor 8 may rise at the same point during braking (see 242 in FIG. 2D).

As described above, according to an exemplary embodiment of the present invention, by configuring the distribution ratios of the regenerative braking torque for the front wheel motor and the rear wheel motor during regenerative braking, stability of the vehicle may be maintained even when driving in track mode in which rapid acceleration and rapid deceleration are repeated.

Also, as illustrated in FIGS. 2A-2D, the sum (see FIGS. 2C and 2D) of the regenerative braking torque of the front wheel motor 2 and the regenerative braking torque of the rear wheel motor 8 in track mode according to an exemplary embodiment of the present invention may be greater than the sum of the regenerative braking torque of the front wheel motor 2 and the regenerative braking torque of the rear wheel motor 8 in normal node (see FIG. 2A and FIG. 2B).

As described above, according to an exemplary embodiment of the present invention, when the braking request from a driver is detected while driving in track mode, the braking of the vehicle may be controlled according to the total required torque in response to the braking request from a driver, and by relatively decreasing friction braking torque by increasing the regenerative braking torque of the total required torque, fade and vapor lock caused by excessive friction braking (that is, hydraulic braking) may be prevented, and also, shortage of heat capacity of the brake may be addressed without increasing the brake size.

Also, according to an exemplary embodiment of the present invention, by configuring the distribution ratios of the regenerative braking torque for the front wheel motor and the rear wheel motor during regenerative braking, stability of the vehicle may be maintained even when driving in track mode in which rapid acceleration and rapid deceleration are repeated.

Also, according to an exemplary embodiment of the present invention, by preventing intervention of the regenerative stability control (RSC) during regenerative braking, it may be expected to improve fuel efficiency when driving in track mode as compared to driving in the non-track mode.

Figure 3:
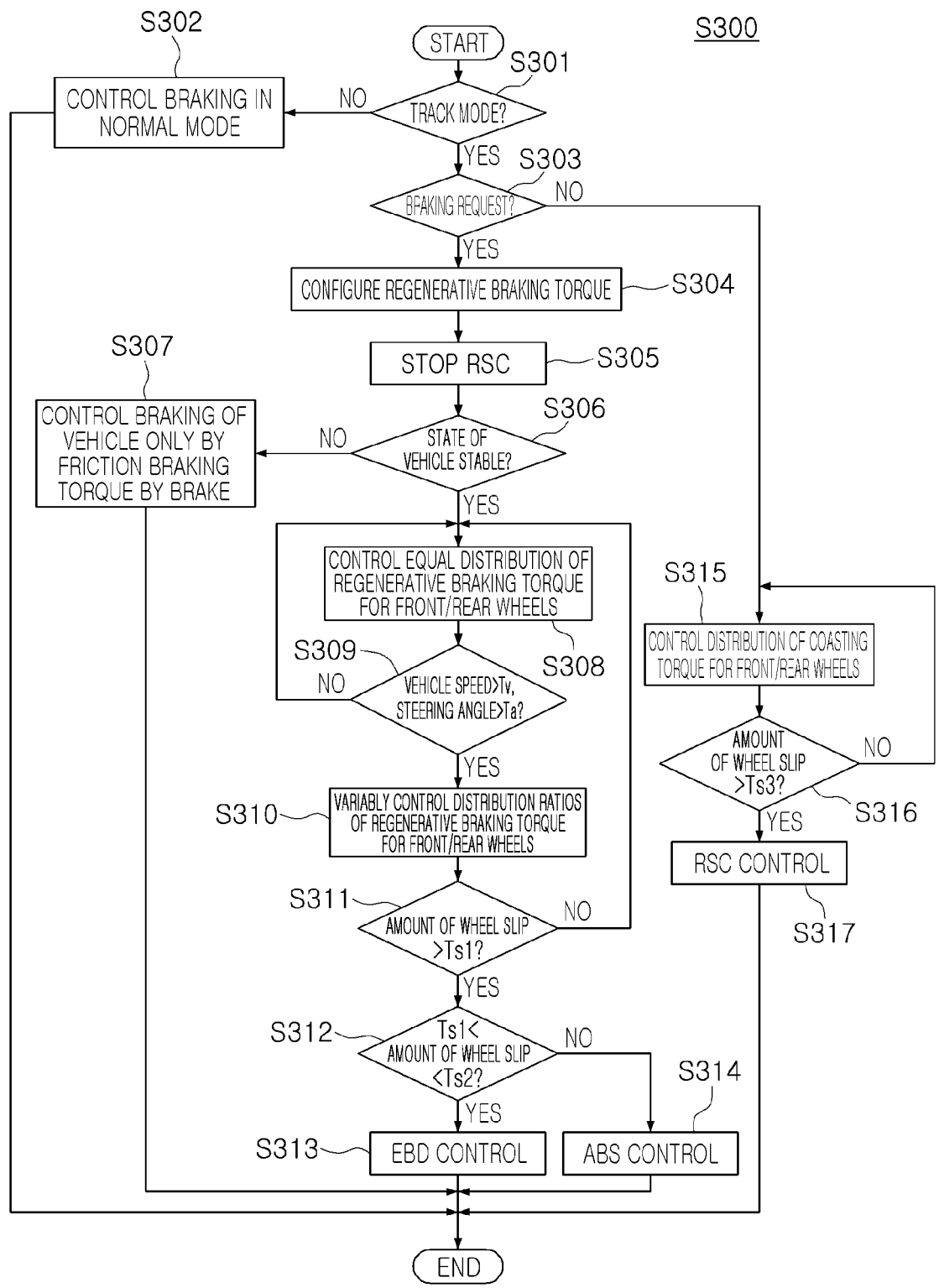
FIG. 3 is a flowchart illustrating a method for controlling braking of vehicle according to an exemplary embodiment of the present disclosure.

FIG. 3 is a flowchart illustrating a method for controlling braking of vehicle according to an exemplary embodiment.

Hereinafter, a method (S300) for controlling braking of vehicle according to an exemplary embodiment will be described with reference to FIG. 1, FIG. 2, and FIG. 3.

First, referring to FIG. 1, FIG. 2, and FIG. 3, the method S300 for controlling braking of vehicle according to an exemplary embodiment of the present invention may start by determining whether a current mode is track mode by the vehicle controller 150 (S301). Track mode may be determined by whether the driver has pressed a specific button (track mode button).

As a result of the determination in operation S301, in the case in which the mode is not track mode, that is, the mode is the normal mode, the vehicle controller 150 may control the braking of the vehicle according to the normal mode (S302). In the case in which the mode is track mode, the operation S303 may be performed so that it may be determined whether there has been a braking request from a driver (S303). As described above, the braking request from a driver may be detected according to the positional value of the brake pedal. The normal mode is as described above.

Thereafter, in the case in which there is a braking request from a driver, the vehicle controller 150 may configure the regenerative braking torque (S304). As described above, the regenerative braking torque may have a maximum allowable torque of the motor as an upper limit, and may be greater than the regenerative braking torque of the non-track mode.

Thereafter, the vehicle controller 150 may stop the regenerative stability control (RSC) (S305).

That is, according to an exemplary embodiment of the present invention, by preventing intervention of the regenerative stability control (RSC) during regenerative braking, fuel efficiency improvement may be expected as compared to driving in the non-track mode as described above.

Thereafter, the vehicle controller 150 may determine whether the state of the vehicle is stable (S306). The vehicle controller 150 may determine that the state of the vehicle is stable when one of the amount of wheel slip, a speed of pressing a brake pedal, a steering angle, a wheel acceleration, and a yaw rate is less than a predetermined value thereof as described above.

In the case in which the vehicle state is not stable, the vehicle controller 150 may control the braking of the vehicle only by friction braking torque by the brake (S307).

In the case in which the vehicle state is stable, the vehicle controller 150 may control the braking of the vehicle V by equally distributing the distribution ratios of the regenerative braking torque of the front wheel motor 2 and the regenerative braking torque of the rear wheel motor 8 (S308).

Thereafter, when the vehicle speed is greater than the predetermined vehicle speed Tv or the steering angle is greater than the predetermined steering angle Ta, the vehicle controller 150 may control the braking of the vehicle V by configuring the distribution ratios of the regenerative braking torque of the front wheel motor 2 and the regenerative braking torque of the rear wheel motor 8 differently (S309, S310). The above-described operations S308 and S310 may be performed in sequence, but an exemplary embodiment thereof is not limited thereto, and only operation S308 or only operation S310 may be performed.

Thereafter, the vehicle controller 150 may further determine whether the amount of wheel slip of the vehicle V is greater than the first wheel slip value Ts1 (S311). In the instant case, in the case in which the amount of wheel slip of the vehicle V is not greater than the first wheel slip value Ts1, operation S308 may be performed, and in the case in which the amount of wheel slip of the vehicle V is greater than the first wheel slip value Ts1, operation S312 may be performed.

As a result of the determination in operation S312, in the case in which the amount of wheel slip of the vehicle V is greater than the first wheel slip value Ts1 and is smaller than the second wheel slip value Ts2, the vehicle controller 150 may maintain the distribution ratios of the regenerative braking torque of the front wheel motor 2 and the regenerative braking torque of the rear wheel motor 8, and may perform electric brake-force distribution (EBD) control with respect to the front wheel 1 and the rear wheel 7 (S313). The above-described EBD control may be a technique for distributing braking force of electronic control, and may be a technique for automatically distributing appropriate braking force to the front wheel 1 and the rear wheel 7 according to the load weight of the vehicle V as described above.

As a result of the determination in operation S312, in the case in which the amount of wheel slip of the vehicle V is equal to or greater than the second wheel slip value Ts2, the vehicle controller 150 may perform anti-lock brake system (ABS) control (S314). As described above, the ABS control may be a technique of preventing the locking of a brake and guaranteeing safety of an occupant.

As a result of the determination in operation S303, in the case in which the braking request from a driver is not detected, the vehicle controller 150 may perform regenerative stability control (S315 to S317).

The vehicle controller 150 may control the braking of the vehicle by distributing the coasting torque to the front wheel 1 and the rear wheel 7 (S315). Thereafter, the vehicle controller 150 may determine whether the amount of wheel slip of the vehicle V is greater than the third wheel slip value Ts3 (S316), and in the case in which the amount of wheel slip of the vehicle V is greater than the third wheel slip value Ts3, regenerative stability control (RSC) may be performed (S317).

As described above, according to an exemplary embodiment of the present invention, when the braking request from a driver is detected while driving in track mode, the braking of the vehicle may be controlled according to the total required torque in response to the braking request from a driver, and by relatively decreasing friction braking torque by increasing the regenerative braking torque of the total required torque, fade and vapor lock caused by excessive friction braking (that is, hydraulic braking) may be prevented, and also, the shortage of heat capacity of the brake may be addressed without increasing the brake size.

Also, according to an exemplary embodiment of the present invention, by configuring distribution ratio of the regenerative braking torque between the front wheel motor and the rear wheel motor during regenerative braking, stability of the vehicle may be maintained even when driving in track mode in which rapid acceleration and rapid deceleration are repeated.

Also, according to an exemplary embodiment of the present invention, by preventing the intervention of the regenerative stability control (RSC) during regenerative braking, fuel economy may improve as compared to driving in the non-track mode.

Figure 4:
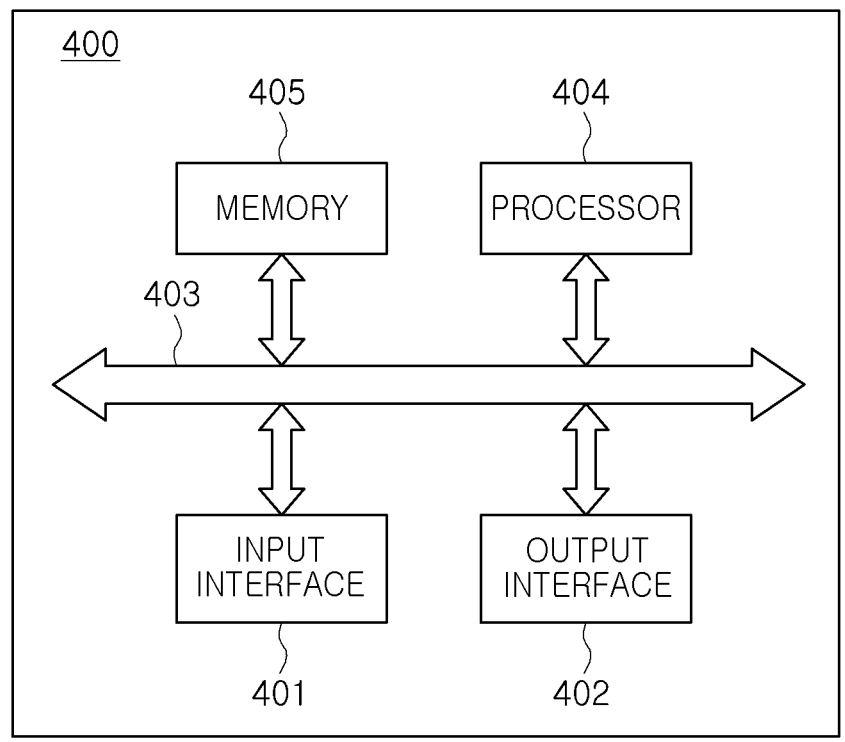
FIG. 4 is a block diagram illustrating a vehicle controller according to an exemplary embodiment of the present disclosure.

Meanwhile, FIG. 4 is a block diagram illustrating a vehicle controller according to an exemplary embodiment of the present invention, and may be applicable to the vehicle controller illustrated in FIG. 1.

As illustrated in FIG. 4, the vehicle controller 400 may include an input interface 401, an output interface 402, a processor 404 and a memory 405, and an input interface 401, an output interface 402, a processor 404, and a memory 405 may be interconnected to each other via a system bus 403.

In an exemplary embodiment of the present invention, the memory 405 may be used to store a program, instruction or code, and the processor 404 may execute the program, instruction or code stored in the memory 405, and may receive a signal by controlling the input interface 401, and may transmit a signal by controlling the output interface 402. The above-described memory 405 may include a read-only memory and a random access memory, and may provide instructions and data to the processor 404.

In an exemplary embodiment of the present invention, the processor 404 may be implemented as a central processing unit (CPU), may be implemented as other general purpose processors, a digital signal processor (DSP), an application specific integrated circuit (ASIC), a field programmable gate array (FPGA) or other programmable logic devices, a discrete gate or transistor logic device, or an individual hardware component. A. A general-purpose processor may be a microprocessor, or the processor may be any general processor, or the like. The above-described processor 404 may perform the above-described operation of the vehicle controller.

In the exemplary embodiment of the present invention, the method in FIG. 3 may be implemented by an integrated logic circuit of hardware in the processor 404 or an instruction in a form of software. The method included in relation to the exemplary embodiment of the present invention may be implemented to be performed and completed by a hardware processor, or to be performed and completed by a combination of hardware and software modules of the processor. The software module may be stored in a storage medium such as random access memory, flash memory, read-only memory, programmable read-only memory or electrically erasable programmable memory, a register, and the like. The storage medium may be positioned in the memory 405, and the processor 404 may read information from the memory 405 and may implement the above-described method in combination with hardware. Overlapping descriptions will not be provided.

As described above, according to the aforementioned exemplary embodiments, when the braking request from a driver is detected while driving in track mode, the braking of the vehicle may be controlled according to the total required torque in response to the braking request from a driver, and by relatively reducing the frictional braking torque relatively by increasing the regenerative braking torque of the total required torque, fade and vapor lock caused by excessive friction braking (that is, hydraulic braking) may be prevented, and also, the issue of insufficient heat capacity of the brake may be addressed without increasing the size of the brake.

Also, by configuring the distribution ratio of the regenerative braking torque between the front wheel motor and the rear wheel motor during regenerative braking, stability of the vehicle may be maintained even when driving in track mode in which rapid acceleration and rapid deceleration are repeated.

Furthermore, by preventing intervention of the regenerative stability control (RSC) during regenerative braking, improvement of fuel economy may be expected as compared to driving in the non-track mode.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of controlling a braking of a vehicle traveling in track mode, the apparatus comprising:
 a driving information detector configured to detect a braking request while the vehicle is driving; and
 a vehicle controller configured to, when the braking request is detected, control the braking of the vehicle according to a total required torque in response to the detected braking request, wherein the total required torque is a sum of a regenerative braking torque by a motor which includes a front wheel motor and a rear wheel motor of the vehicle and a friction braking torque by a brake of the vehicle, wherein, the track mode is a driving mode in which rapid acceleration and rapid deceleration are repeated for driving on a dedicated race track and for a quick lap time, wherein the vehicle controller is configured to decrease braking force by friction braking by relatively decreasing the friction braking torque by increasing the regenerative braking torque of the total required torque, wherein when the braking request is detected, the vehicle controller is further configured to control the braking of the vehicle by equally distributing distribution ratios of a regenerative braking torque of the front wheel motor and a regenerative braking torque of the rear wheel motor, and when a vehicle speed is greater than a predetermined vehicle speed or a steering angle is greater than a predetermined steering angle, the vehicle controller is further configured to control the braking of the vehicle by configuring the distribution ratios of the regenerative braking torque of the front wheel motor and the regenerative braking torque of the rear wheel motor to be different from each other, whereby the regenerative braking torque of the front wheel motor and the regenerative braking torque of the rear wheel motor rise at a same point during the braking, and wherein the regenerative braking torque in the track mode is greater than a regenerative braking torque in non-track mode.

2. The apparatus of claim 1, wherein, when an amount of wheel slip of the vehicle is greater than a first wheel slip value and smaller than a second wheel slip value, the vehicle controller is further configured to maintain the distribution ratios of the regenerative braking torque of the front wheel motor and the regenerative braking torque of the rear wheel motor, and is further configured to perform electric brake-force distribution (EBD) control with respect to a front wheel and a rear wheel of the vehicle.

3. The apparatus of claim 1, wherein, when an amount of wheel slip of the vehicle is equal to or greater than a second wheel slip value which is greater than a first wheel slip value, the vehicle controller is further configured to perform anti-lock brake system (ABS) control.

4. The apparatus of claim 1, wherein, when the braking request is detected, the vehicle controller is further configured to stop regenerative stability control (RSC).

5. The apparatus of claim 1, wherein, when the braking request is not detected, the vehicle controller is further configured to perform regenerative stability control (RSC).

6. The apparatus of claim 5, wherein the vehicle controller is further configured to control the braking of the vehicle by distributing coasting torque for front and rear wheels of the vehicle, and when an amount of wheel slip of the vehicle is greater than a predetermined wheel slip value, the vehicle controller is further configured to perform the RSC.

7. The apparatus of claim 1, wherein the vehicle controller is further configured to control the braking of the vehicle when one of an amount of wheel slip, a speed of pressing a brake pedal, the steering angle, a wheel acceleration, and a yaw rate is less than a predetermined value.

8. A method for controlling a braking of a vehicle traveling in track mode, the method comprising:

detecting, by a driving information detector, a braking request while the vehicle is driving; and when the braking request is detected, controlling, by a vehicle controller, the braking of the vehicle according to a total required torque in response to the detected braking request, wherein the total required torque is a sum of a regenerative braking torque by a motor which includes a front wheel motor and a rear wheel motor of the vehicle and a friction braking torque by a brake of the vehicle, wherein, the track mode is a driving mode in which rapid acceleration and rapid deceleration are repeated for driving on a dedicated race track and for a quick lap time, wherein the controlling of the braking of the vehicle includes reducing braking force by friction braking by relatively decreasing the friction braking torque by increasing the regenerative braking torque of the total required torque, wherein the controlling of the braking of the vehicle further includes controlling, when the braking request is detected, the braking of the vehicle by equally distributing distribution ratios of a regenerative braking torque of the front wheel motor and a regenerative braking torque of the rear wheel motor and controlling, when a vehicle speed is greater than a predetermined vehicle speed or a steering angle is greater than a predetermined steering angle, the braking of the vehicle by configuring the distribution ratios of the regenerative braking torque of the front wheel motor and the regenerative braking torque of the rear wheel motor to be different from each other, thereby the regenerative braking torque of the front wheel motor and the regenerative braking torque of the rear wheel motor rise at a same point during the braking, and wherein the regenerative braking torque in the track mode is greater than a regenerative braking torque in non-track mode.

9. The method of claim 8, wherein the controlling of the braking of the vehicle further includes:

maintaining, when an amount of wheel slip of the vehicle is greater than a first wheel slip value and smaller than a second wheel slip value, the distribution ratios of the regenerative braking torque of the front wheel motor and the regenerative braking torque of the rear wheel motor and performing electric brake-force distribution (EBD) control with respect to a front wheel and a rear wheel of the vehicle.

10. The method of claim 8, wherein the controlling of the braking of the vehicle further includes:

performing, when an amount of wheel slip of the vehicle is equal to or greater than a second wheel slip value which is greater than a first wheel slip value, anti-lock brake system (ABS) control.

11. The method of claim 8, further including:

stopping regenerative stability control (RSC) when the braking request is detected.

12. The method of claim 8, further including:

performing regenerative stability control (RSC) when the braking request is not detected.

13. The method of claim 12, wherein the performing the RSC includes:

controlling the braking of the vehicle by distributing coasting torque for front and rear wheels of the vehicle; and performing, when an amount of wheel slip of the vehicle is greater than a predetermined wheel slip value, regenerative stability control (RSC).

14. The method of claim 8, wherein the method is performed when one of an amount of wheel slip, a speed of stepping on a brake pedal, the steering angle, a wheel acceleration, and a yaw rate is less than a predetermined value-thereof.

15. A non-transitory computer readable storage medium in which a program for executing the method of claim 8 in a computer is written.

* * * * *